(12) United States Patent
Otto

(10) Patent No.: US 6,688,445 B2
(45) Date of Patent: Feb. 10, 2004

(54) CLUTCH REGULATING DEVICE WITH TORQUE SENSOR AND DISPLACEMENT SENSOR

(75) Inventor: Thomas Otto, Würzburg (DE)

(73) Assignee: Mannesmann Sachs AG, Schweinfurt (DE)

(*) Notice: Subject to any disclaimer, the term of this patent is extended or adjusted under 35 U.S.C. 154(b) by 6 days.

(21) Appl. No.: 10/053,336

(22) Filed: Jan. 18, 2002

(65) Prior Publication Data

US 2002/0096416 A1 Jul. 25, 2002

(30) Foreign Application Priority Data

Jan. 19, 2001 (DE) .......... 101 02 373
Apr. 27, 2001 (DE) .......... 101 20 662

(51) Int. Cl.⁷ .......... F16D 48/06; F16D 23/14; F16D 25/08
(52) U.S. Cl. .......... 192/85 CA; 192/98; 192/30 W
(58) Field of Search .......... 192/30 W, 85 CA, 192/91 A, 98, 111 A

(56) References Cited

U.S. PATENT DOCUMENTS

| | | | | |
|---|---|---|---|---|
| 4,440,279 A | * | 4/1984 | Schreiner | 192/30 W |
| 4,474,274 A | * | 10/1984 | Lutz et al. | 192/30 W |
| 4,705,151 A | * | 11/1987 | Leigh-Monstevens et al. | 192/111 A |
| 5,285,691 A | * | 2/1994 | Baer | 73/862.325 |
| 5,330,039 A | * | 7/1994 | Baker | 192/30 W |
| 6,047,800 A | * | 4/2000 | Kosik et al. | 192/3.57 |
| 6,062,366 A | * | 5/2000 | Herzig et al. | 192/85 CA |
| 6,098,774 A | * | 8/2000 | Herzig et al. | 192/85 CA |
| 6,540,059 B2 | * | 4/2003 | Drexl | 192/86 |

* cited by examiner

Primary Examiner—Richard M. Lorence
(74) Attorney, Agent, or Firm—Cohen, Pontani, Lieberman & Pavane

(57) ABSTRACT

A clutch system comprises a clutch arrangement, an adjusting device for actuating the clutch arrangement, a displacement sensor arrangement for detecting a first quantity relating to the movement of a component which displaces when an actuating process is carried out, and a torque sensor arrangement for detecting a second quantity relating to a clutch torque transmitted via the clutch arrangement. The control device controls the adjusting device for carrying out actuating processes at least occasionally depending on at least the second quantity.

14 Claims, 4 Drawing Sheets

US 6,688,445 B2

CLUTCH REGULATING DEVICE WITH TORQUE SENSOR AND DISPLACEMENT SENSOR

BACKGROUND OF THE INVENTION

1. Field of the Invention

The present invention is directed to a clutch system comprising a clutch arrangement and an adjusting device for actuating the clutch arrangement, which adjusting device is controlled by a control device for carrying out actuation processes.

2. Description of the Related Art

Clutch systems of the type mentioned above, which are also generally known in the prior art as automatic clutch systems, are increasingly used in motor vehicles. In order to engage or release the clutch at the correct time and with the correct speed, particularly also so as to be synchronized with the shifting processes to be carried out in a transmission, the control device, which ultimately activates the adjusting device for carrying out determined adjusting processes by means of corresponding signals, must obtain information about the instantaneous operating state of the clutch. For this purpose, it is known to detect the release path of the clutch, for example, by detecting the release position of a slave cylinder of a fluid clutch release system. There is generally a definite relationship between a release position of the type mentioned above and the operating state of the clutch and, therefore, the coupling moment or clutch torque which is transmitted instantaneously or the maximum clutch torque which can be transmitted. However, this relationship is not constant over the operating life of a clutch due to wear and can also change, for example, due to temperature in the area of the clutch. As a result of a change in the relationship, initially assumed to be fixed, between the movement or the position of a clutch release element and the clutch torque which is actually transmitted via the clutch, the clutch is adjusted too soon or too quickly, for example, beyond an operating position in which or after which the clutch starts to transmit torque proceeding from a completely released position. This can result in engagement shock which can lead to excessive wear when it occurs frequently and, at the least, can cause an unpleasant sensation for the driver of a vehicle outfitted with a system of this kind.

SUMMARY OF THE INVENTION

It is the object of the present invention to provide a clutch system in which an actuating process of a clutch arrangement can be implemented with increased precision.

According to the present invention, this object is met by a clutch system comprising a clutch arrangement, an adjusting device for actuating the clutch arrangement, which adjusting device is controlled by a control device for carrying out actuation processes, a displacement sensor arrangement for detecting a first quantity relating to the movement of a component which displaces when an actuating process is carried out, and a torque sensor arrangement for detecting a second quantity relating to a clutch torque transmitted via the clutch arrangement, wherein the control device controls the adjusting device for carrying out actuating processes at least occasionally depending on at least the second quantity.

According to the present invention, the detected torque transmitted via the clutch or a quantity relating to the latter is included at least occasionally in generating a control signal for the adjusting device. When engaging and releasing processes are carried out, particularly in connection with a gear shifting process, the torque actually transmitted via the clutch is a determining quantity for carrying out the fastest possible gear shifting processes on one hand and to achieve the most comfortable possible shifting process on the other hand. Accordingly, by taking this quantity into account at least occasionally, it can ultimately be ensured in a clutch torque control loop that the torque, which is transmitted or which can be transmitted via the clutch corresponds exactly to a clutch torque to be provided for a determined shifting process or other operating state of a vehicle.

According to the invention, the control device can control the adjusting device based on the second quantity when carrying out an actuating process. Alternatively, it is possible for the control device to control the adjusting device occasionally based on the first quantity and occasionally based on the second quantity. For example, the control device can control the adjusting device based on the first quantity in one phase of an actuating process in which an actuation of the clutch arrangement has essentially no influence on the clutch torque.

Phases of an actuating process in a friction clutch in which an adjustment of the clutch arrangement has essentially no influence, i.e., possibly only a slight influence, on the clutch torque are, for example, phases in which the clutch is moved from a completely released position toward a slip point, that is, to an operating state after which the clutch starts to transmit torque. In this noncritical range, a comparatively rough adjustment, but one which is or can be carried out quickly, can be performed based on the quantity relating to the displacement path. When the clutch approaches the critical operating state, there is a transition in the next phase to torque regulation in which the determining quantity for further adjustment of the clutch is the clutch torque. Also, in this state in which the clutch torque, i.e., the torque transmitted via the clutch, is in the range of the maximum driving torque that can be generated by a drive unit but has not yet reached the maximum torque that can be transmitted via the clutch, a comparatively fast adjustment can be carried out, for example, in the direction of a completely engaged position.

In order to provide a certain degree of redundancy, i.e., increased safety, when actuating the clutch arrangement, it is suggested that the control device controls the adjusting device at least occasionally based on the first quantity and the second quantity when carrying out an actuating arrangement. When the two quantities are utilized simultaneously for correct actuation of the clutch arrangement, it can be provided, for example, that the sum, the product, the sum of the squares, and so on, of the two quantities are formed and a quantity is accordingly obtained on the basis of which an engagement process or a releasing process can be carried out.

Regardless of whether the first quantity is used occasionally by itself or together with the second quantity for carrying out an actuating process, it can be provided according to a further advantageous feature of the present invention that a change in the operating state of the clutch system, preferably wear occurring in the area of the clutch arrangement, is determined on the basis of the first quantity.

For example, if it is not compensated by a readjusting device, the wear occurring in a clutch arrangement leads to a displacement of different components which can be determined, for example, in a defined state. This defined state can be a completely engaged state, for example. Based on this information on the operating state of the clutch, that is, for example, information about wear, readjusting steps can be initiated in the clutch release system or, for example, corresponding compensation steps can be triggered in the clutch arrangement. Further, it is possible to generate a warning for the driver when a maximum permissible wear is detected.

According to the invention, the displacement sensor arrangement preferably detects the displacement of a clutch release component. For example, the clutch release component can be a release piston of a release piston-cylinder arrangement.

According to another feature of the present invention which is advantageous particularly with respect to simplified assembly, the displacement sensor arrangement and the torque sensor arrangement are joined in a subassembly or constructional group.

For example, the torque sensor arrangement can have a sensing or pickup area which scans a code provided at a clutch output shaft. In an embodiment form which is particularly advantageous with respect to electrical connection, the pickup area can be fixed axially with respect to the clutch output shaft. Alternatively, however, it is also possible that the pickup area is axially displaceable with a clutch release component, preferably a release piston of a release piston-cylinder arrangement. Accordingly, the pickup area moves in axial direction when carrying out an engagement or release process and, in so doing, can, in addition, supply a signal representing the release path. Accordingly, the displacement sensor arrangement and torque sensor arrangement are integrated in this instance.

Further, according to the present invention, a method is provided for actuating a clutch arrangement which can be actuated by an adjusting device, comprising the following steps:
  a) detection of a first quantity relating to the displacement path of a component which moves when the clutch arrangement is actuated;
  b) detection of a second quantity relating to a clutch torque transmitted via the clutch arrangement;
  c) at least occasional control of the adjusting device for actuating the clutch arrangement based on at least the second quantity.

In this method, the adjusting device can be controlled occasionally based on the first quantity and occasionally based on the second quantity. Alternatively, it is possible that the adjusting device is controlled at least occasionally based on the first quantity and the second quantity.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
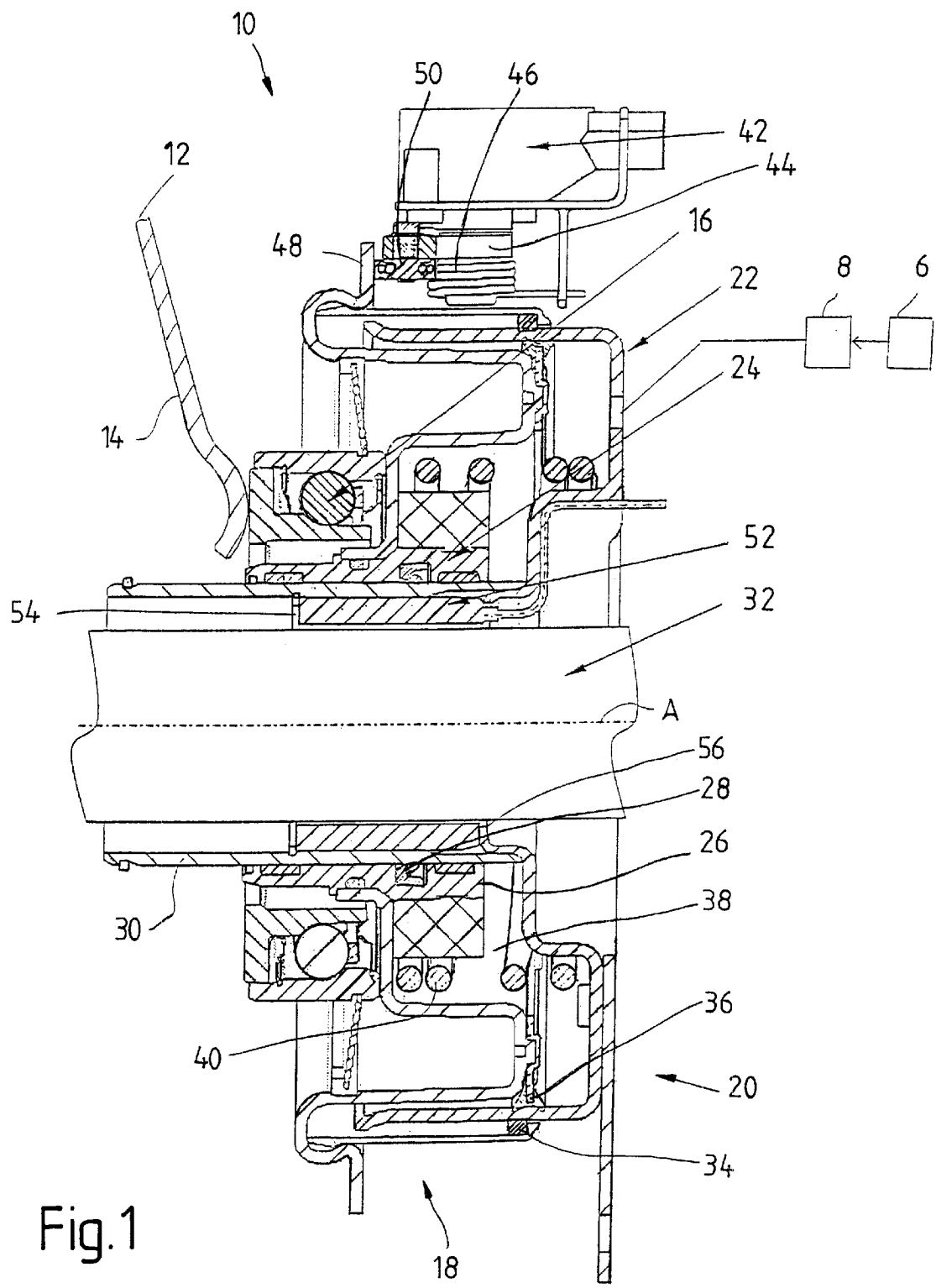
FIG. 1 shows a longitudinal sectional view through different components of a clutch system.

The clutch system 10 shown in FIG. 1 comprises a clutch arrangement whose construction is known in principle and which is therefore not shown in more detail and which has, for example, a diaphragm spring 12 as an energy accumulator and is represented by the latter in the drawing. The radial inner area of spring tongues 14 can be acted upon via a clutch release bearing 16 by a release system 18. In the construction variant shown in the drawing, the release system 18 comprises a release piston-cylinder arrangement 20. The latter has a release cylinder 22 which is secured, for example, to a transmission housing and in which a release piston 24 is received so as to be displaceable in direction of an axis of rotation A. A radial inner part 26 of the piston is displaceable on a cylindrical projection 30 of the release cylinder 22 with the intermediary of an annular sealing element 28. An output shaft 32 of the clutch system 10 is arranged so as to be rotatable within this cylindrical projection 30 and is coupled or can be coupled with at least one clutch disk, not shown in FIG. 1, so as to be fixed with respect to rotation relative to it and forms a transmission input shaft, for example.

On the radial outer side, the release piston 24 is closed so as to be substantially tight against fluid by means of a plurality of sealing elements 34, 36, so that a cylinder chamber 38 is formed in which fluid, for example, compressed air or liquid under pressure, can be introduced in order to displace the release piston 24 toward the left with reference to FIG. 1 and to release the clutch arrangement. Further, a pretensioning spring 40 constructed as a helical pressure spring holds the release bearing 16 in defined contact with the spring tongues 14 via the release piston 24.

The system shown in FIG. 1 further comprises a displacement sensor 42 which is arranged so as to be stationary with respect to the release cylinder 22, for example, and which detects the displacement of the release piston 24 relative to the release cylinder 22. For this purpose, the displacement sensor 42 has a sensor arm 44 which is pretensioned by a leg spring 46 and is held in contact with a portion 48 of the release piston 24 that projects radially outward. This contact can be effected by means of a rotatable contact wheel 50, for example, for purposes of reduced friction. When the release piston 24 is displaced, the sensor arm 44 is displaced accompanied by pretensioning of the leg spring 46, which is detected by a detection arrangement, e.g., an inductive detection arrangement, within the displacement sensor 42 and is converted into a corresponding detection signal.

Further, a torque sensor 52 is provided in the clutch system 10 according to the invention. The torque sensor 52 is arranged essentially concentric to the axis of rotation A within the cylindrical projection 30 of the release cylinder 22 and is fixed axially with respect to the release cylinder 22 by a retaining ring 54 on one side and, on the other side, by a flange-like shoulder 56 of the release cylinder 22 projecting radially inward. Torque sensors of the kind mentioned above are available from Fast Technology, Munich, for example, and are based on scanning a code on the shaft 32. For this purpose, a twisting of the code which is provided at the outer circumferential surface of the drive shaft 32 can be determined, for example, in or in the vicinity of the two axial end areas of the torque sensor 52, which twisting serves as a measurement for the torque transmitted instantaneously via the shaft 32 taking into account the torsional rigidity of the shaft 32. This torque transmitted via the transmission input shaft 32 essentially also corresponds to the torque transmitted via the clutch arrangement and has a unique relationship to the latter. The torque sensor 52 generates a signal which represents the torque transmitted via the shaft 32 and accordingly also represents the clutch torque.

The two signals supplied by the displacement sensor 42 and the torque sensor 52 can be utilized in the electronic system of a vehicle, for example, in a control device 6 for the clutch system, in the following manner:

When an actuating process of the clutch arrangement is carried out, the control device 6 which is indicated schematically in FIG. 1 controls an adjusting device 8, likewise shown schematically, which initiates a supply of pressure fluid into the cylinder chamber 38 corresponding to the control by the control device 6. In this case, the adjusting device can comprise a valve, for example, which adjusts the fluid flow path between a pressure fluid source and the cylinder chamber 38 corresponding to the control by the control device 6. However, it is noted that, of course, the adjusting device, like the release system, can have a different type of construction, that is, for example, it can also operate mechanically. The actual construction design of the adjusting device 8 is of secondary importance with regard to the principles of the present invention. This applies also to the actual construction design of the release system 18 shown in the Figures. According to the principles of the present invention, for purposes of the control carried out by the control device 6, the signal emitted by the torque sensor 52 is utilized within the framework of a torque control loop in order to regulate the torque which is transmitted by the shaft 32, and accordingly also by the clutch arrangement, by means of the above-described deliberate supply and discharge of pressure fluid, for example, corresponding to the shifting process or shifting processes to be carried out in a transmission arrangement. Accordingly, the relevant quantity when carrying out a coupling process, namely, the clutch torque, can be used directly within the framework of this control loop. Of course, it is also possible, in addition, to use the signal emitted by the displacement sensor 42 within the framework of this control loop or within the framework of a redundant control loop in order, for example, to verify the correct operation of the clutch system 10, according to the invention, for example, within the framework of a plausibility check. Also, it is possible in principle to resort to different sensor signals to carry out the actuating process in different phases of an engagement process or release process. For example, the clutch arrangement can be adjusted relatively quickly within the framework of a comparatively crude control loop based on the adjusting path of the release piston 24 during noncritical phases, that is, in phases in which a change in the adjusting state of the clutch arrangement has only a slight influence, if any, on the torque transmitted by the clutch arrangement. However, when the clutch arrangement is moved into a critical area, that is, into an area where even minimal changes in the adjusting state lead to noticeable changes in the torque transmitted by the clutch, torque regulation is then carried out according to the invention based on the output of the torque sensor 52.

Regardless of whether the output signal of the displacement sensor 42 is utilized occasionally as an alternative to the signal of the torque sensor 52 or together with this signal within the framework of the adjustment of the clutch to be carried out in an engagement process or release process, the operating state of the clutch arrangement can be deduced based on the signal emitted by the displacement sensor 42. In particular, conclusions can be reached with regard to the extent of wear that has already occurred in the friction facings of the clutch disk or clutch disks in a clutch arrangement of this type. In a push-type clutch arrangement, increased wear in the friction facings causes the energy accumulator to change from its installed position due to the pressure plate being located nearer to the flywheel in the completely engaged position, with the result that the spring tongues 14 of the energy accumulator 12 move farther away from the flywheel in the radial inner area, that is, they are displaced farther to the right with reference to FIG. 1. Consequently, the release piston 24 also changes from its installed position in the completely engaged position which can be detected by the displacement sensor 42. Accordingly, a warning can be generated, for example, based on the output signal of the displacement sensor 42 when a maximum permissible wear, and accordingly also a maximum permissible displacement of the release piston 24, is detected in the completely engaged position. Further, it is possible, based on this detection, to take active steps toward compensation of wear in corresponding wear compensation arrangements in the release system or also within the clutch itself.

Figure 2:
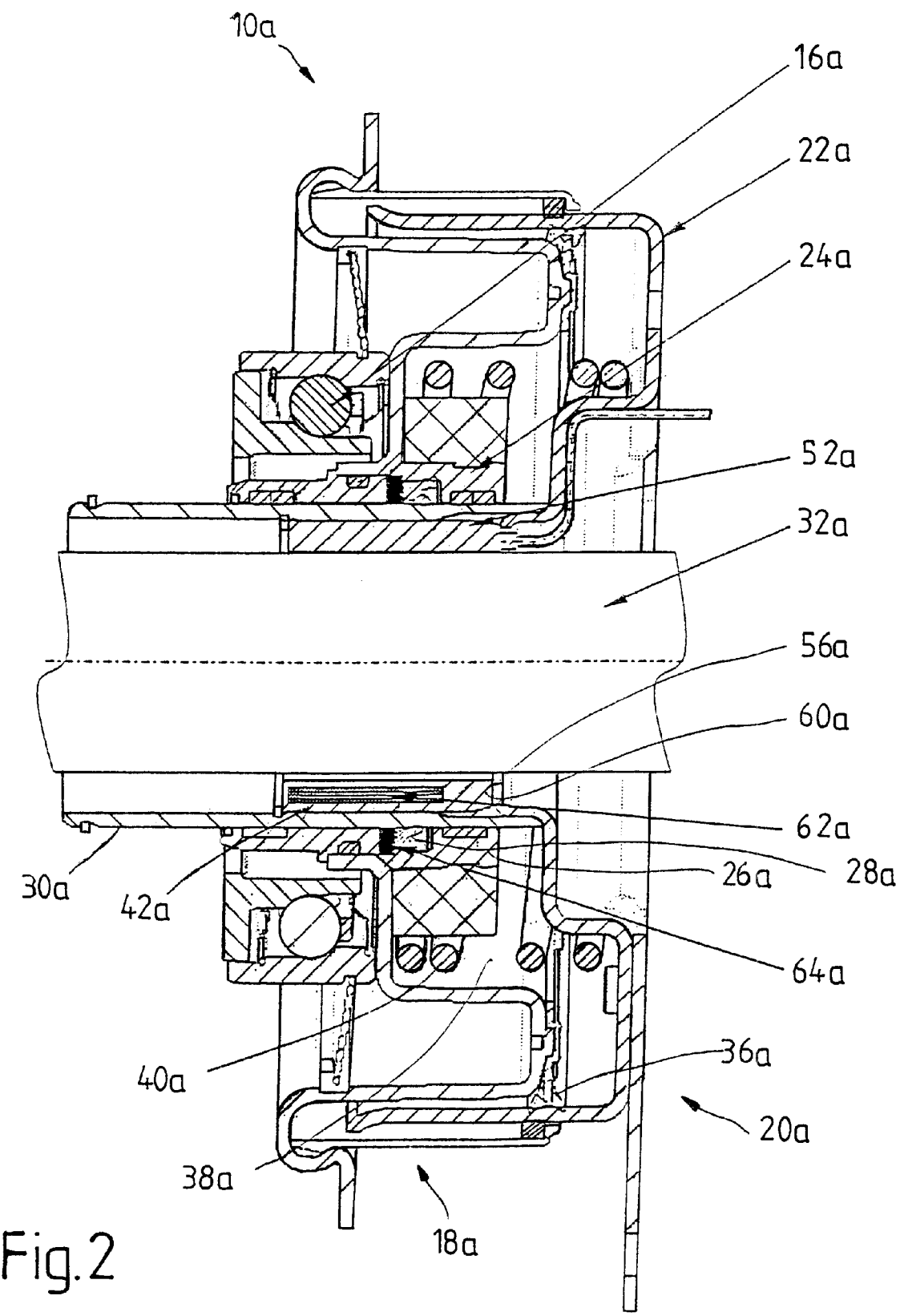
FIG. 2 shows an alternative embodiment form of the system shown in FIG. 1.

An alternative construction of the clutch system according to the invention or a portion thereof is shown in FIG. 2. Components which correspond with respect to construction or function to components described above are designated by the same reference numbers with an "a" appended to them. In the following, only differences existing relative to the embodiment form according to FIG. 1 are described.

While the displacement sensor is provided as a separate constructional unit and is accordingly separate from the torque sensor in the embodiment form shown in FIG. 1, these two sensors form a subassembly or constructional unit in the embodiment form according to FIG. 2. In addition to the sensor components required for detecting torque, that is, for example, the components required for sensing the code on the shaft 32a, a pickup area 62a of the displacement sensor 42a is also provided in the sensor housing 60a. This can also be an induction coil, for example. In this case, a signal transmitter area 64a of the displacement sensor 42a is displaceable with the release piston 24a. This signal transmitter area 64a can be formed by a ring, for example, which surrounds the coil 62a and is constructed as a permanent magnet in at least some areas. The relative displacement of this signal transmitter area 64a with respect to the axially stationary area of the displacement sensor 42a can be detected inductively as is known per se, so that an output signal representing the displacement path of the release cylinder 24a can also be generated in the displacement sensor 42a in this case. The signal generated in the torque sensor 52a and the signal generated in the displacement sensor 42a can then be used to regulate the displacement movement based on these signals as was described above. Also, an embodiment form which is very compact and comparatively easy to build is provided in this case because of the cable routing of these two sensors 42a, 52a which can be joined together.

Figure 3:
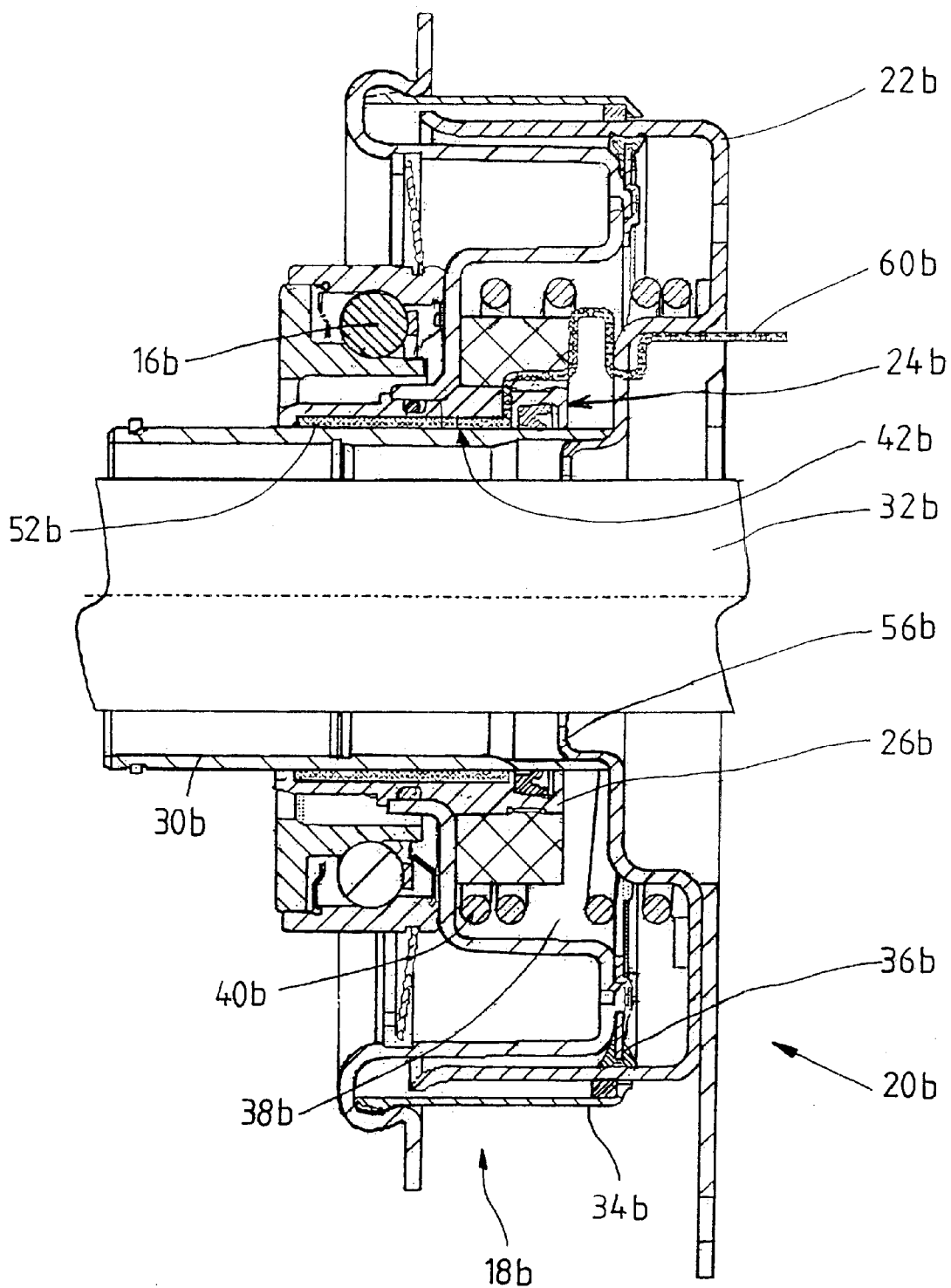
FIG. 3 shows another alternative embodiment form of the system shown in FIG. 1.

Another alternative embodiment form of the system according to the invention is shown in FIG. 3. Components which correspond with respect to construction or function to components described above are designated by the same reference numbers with a "b" appended to them.

In the construction variant shown in FIG. 3 which corresponds to the construction variants described above with respect to the basic construction of the release system 18b, the torque sensor 52b is now integrated in the release piston 24b which displaces axially with respect to the shaft 32b. It will be seen that the torque sensor 52b is inserted in the radial inner area of the part 26b of the piston, for example, in a recess in the inner circumferential area. The electric connecting lead 60b must be constructed in such a way that it can follow the axial movement of the release piston 24b and permits this movement. In this case, as in the other embodiment forms, the shaft 32 also contains a code which is formed by magnetization and which is scanned by the torque sensor 52b, that is, for example, detected by two receiver coils or the like which are arranged at a distance axially. The twist of the shaft 32b and therefore the transmitted torque can be determined by means of the detection signals from these two areas, these detection signals being offset with respect to time, for example. Further, the shaft 32b can have a code which is sensed in axial direction by a pickup area in the torque sensor 52b, i.e., which can detect the relative axial position of the torque sensor 52b and of the pickup area provided therein with respect to the shaft 32b in cooperation with the corresponding pickup area. In this way, information about the axial position of the release piston can be obtained so that an additional displacement sensor is no longer required.

Since a code which is formed by magnetization or partial magnetization of the shaft 32b is again sensed in the construction variant of the torque sensor 52b shown in FIG. 3, it is necessary that the cylindrical projection 30b which is still located radially inside the torque sensor 52b is formed of non-magnetizable or non-magnetic material.

Figure 4:
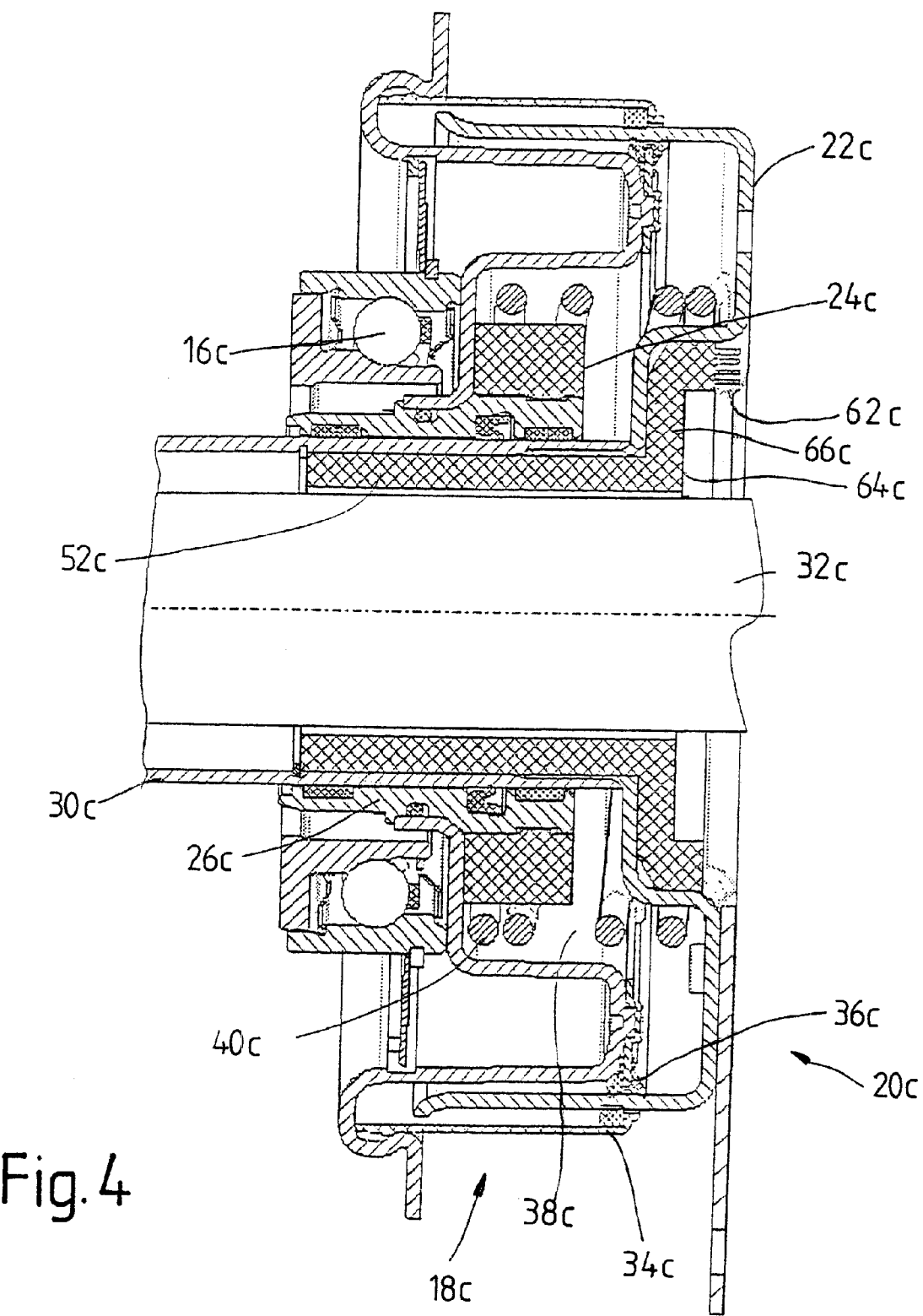
FIG. 4 shows another alternative embodiment form of the system shown in FIG. 1.

FIG. 4 shows another alternative embodiment form of the system according to the invention. Components which correspond with respect to construction or function to components described above are designated by the same reference numbers with a "c" appended to them.

The construction variant shown in FIG. 4 basically corresponds to the variant that has already been described with reference to FIG. 1. In this case also, the torque sensor 52c is arranged inside the cylindrical projection 30c and secured to it. However, the electrical connection is not provided by a line connection or cable connection, but by a plug-in connection 62c, which is provided directly at a housing 64c of the torque sensor 52c, for example, in a radial outer area of a radial flange-like projection 66c. When the entire subassembly shown in FIG. 4 is moved axially to the transmission housing wall, the plug-in connection 62c provided at the housing 64c, or the portion of the plug-in connection provided at the latter, enters into a complementary piece which is provided at the transmission housing wall, so that the plug-in connection can be produced in a simple manner.

It is noted that, of course, the signals detected and used according to the invention, particularly the signal representing the clutch torque, can also be used for other purposes in a total system vehicle. For example, it is possible to change the engine driving torque by adapting to the changing clutch torque when carrying out a gear shifting process so that a more comfortable and faster shifting process can be carried out also by means of a defined relationship between the engine driving torque and the clutch torque.

Further, it is noted that, of course, in addition to the signals and outputs of the displacement sensor and torque sensor described above, other quantities can also be incorporated into the control of the clutch arrangement as is generally known in the prior art. However, this is of secondary importance as regards the principles of the present invention, and only the essential quantities to be taken into account according to the invention, namely, the clutch torque or a quantity relating to the latter and, if required, also the adjustment path or a quantity relating to it, have been referred to in the preceding.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A clutch system comprising
   a clutch arrangement for transmitting a clutch torque, said clutch arrangement comprising a release piston and a release cylinder,
   an adjusting device for actuating the clutch arrangement; by displacing said piston axially with respect to said cylinder,
   a displacement sensor for detecting a first quantity relating to displacement of said piston with respect to said cylinder,
   a torque sensor for detecting a second quantity relating to said clutch torque, said torque sensor being fixed to one of said piston and said cylinder, and
   a control device which controls said adjusting device for actuating the clutch arrangement based on said second quantity at least occasionally.

2. A clutch system as in claim 1 wherein said control device can control said adjusting device for actuating the clutch arrangement based only on said second quantity.

3. A clutch system as in claim 1 wherein said control device controls said adjusting device for actuating the clutch arrangement occasionally based on the first quantity and occasionally based on the second quantity.

4. A clutch system as in claim 3 wherein the control device controls the adjusting device for actuating the clutch arrangement based on the first quantity when an actuation of the clutch arrangement has essentially no influence on the clutch torque.

5. A clutch system as in claim 1 wherein the control device controls the adjusting device for actuating the clutch arrangement at least occasionally based on both the first quantity and the second quantity.

6. A clutch system as in claim 1 wherein said first quantity is used to determine the operating state of the clutch system.

7. A clutch system as in claim 6 wherein the operating state of the clutch system comprises wear occurring in the clutch arrangement.

8. A clutch system as in claim 1 wherein said displacement sensor and said torque sensor are integrated into a single constructional unit.

9. A clutch system as in claim 1 wherein said clutch arrangement comprises an output shaft provided with a code, said torque sensor comprising a pickup which senses said code.

10. A clutch system as in claim 9 wherein said pickup is fixed axially with respect to said clutch output shaft.

11. A clutch system as in claim 9 wherein said pickup is axially displaceable with said release piston.

12. A method for actuating a clutch arrangement which transmits a clutch torque, said method comprising providing a release arrangement comprising a release piston and a release cylinder, providing an adjusting device for actuating the clutch arrangement by displacing said piston axially with respect to said cylinder, displacing said piston with respect to said cylinder, detecting a first quantity relating to the displacement of said piston with respect to said cylinder when said clutch arrangement is actuated, detecting a second quantity relating to the clutch torque transmitted by the clutch arrangement by means of a torque sensor fixed to one of said piston and said cylinder, and at least occasionally controlling the adjusting device for actuating the clutch arrangement based on at least the second quantity.

13. A method as in claim 12 wherein said adjusting device is occasionally controlled based on the first quantity and occasionally controlled based on the second quantity.

14. A method as in claim 13 wherein the adjusting device is controlled at least occasionally based on both the first quantity and the second quantity.

* * * * *